United States Patent
Pipilos

(10) Patent No.: US 7,155,185 B2
(45) Date of Patent: Dec. 26, 2006

(54) APPARATUS AND METHODS FOR ELIMINATING DC OFFSET IN A WIRELESS COMMUNICATION DEVICE

(75) Inventor: Spyros Pipilos, Athens (GR)

(73) Assignee: Theta Microelectronics, Inc., San Jose, CA (US)

( * ) Notice: Subject to any disclaimer, the term of this patent is extended or adjusted under 35 U.S.C. 154(b) by 428 days.

(21) Appl. No.: 10/864,139

(22) Filed: Jun. 9, 2004

(65) Prior Publication Data
US 2005/0277396 A1    Dec. 15, 2005

(51) Int. Cl.
*H04B 1/06* (2006.01)

(52) U.S. Cl. .............................. 455/232.1; 455/250.1; 455/235.1

(58) Field of Classification Search ............. 455/232.1, 455/235.1, 245.1, 245.2, 251.1, 341, 253.1, 455/240.1, 253.2, 307, 313, 296, 306, 337
See application file for complete search history.

(56) References Cited

U.S. PATENT DOCUMENTS

| | | | |
|---|---|---|---|
| 4,593,252 A * | 6/1986 | Korn ........................... 330/260 |
| 4,696,055 A * | 9/1987 | Marshall ................... 455/234.1 |
| 5,161,254 A * | 11/1992 | Braathen ..................... 455/306 |
| 6,429,697 B1 | 8/2002 | Amazeen et al. ............. 327/87 |
| 6,442,383 B1 | 8/2002 | Iemura |
| 6,560,448 B1 | 5/2003 | Baldwin et al. |
| 6,621,334 B1 * | 9/2003 | Ausserlechner et al. .... 455/337 |
| 6,654,593 B1 | 11/2003 | Simmons et al. |
| 6,700,514 B1 | 3/2004 | Soltanian et al. |
| 6,735,422 B1 * | 5/2004 | Baldwin et al. .......... 455/240.1 |
| 6,766,153 B1 * | 7/2004 | Kozak et al. ............. 455/232.1 |
| 6,771,945 B1 * | 8/2004 | Pickett et al. ................ 455/324 |
| 7,110,734 B1 * | 9/2006 | Mohindra ................ 455/250.1 |
| 2003/0076902 A1 | 4/2003 | Yuan |
| 2003/0103581 A1 | 6/2003 | Rawlins et al. |
| 2003/0128776 A1 | 7/2003 | Rawlins et al. |
| 2003/0174079 A1 | 9/2003 | Soltanian et al. |
| 2003/0203728 A1 | 10/2003 | Filipovic |
| 2004/0053586 A1 | 3/2004 | Simmons et al. |
| 2004/0063417 A1 | 4/2004 | Binshtok et al. |
| 2006/0066397 A1 * | 3/2006 | Dupuie ..................... 455/232.1 |
| 2006/0097788 A1 * | 5/2006 | Yang et al. .................. 330/254 |
| 2006/0125567 A1 * | 6/2006 | Mizoe ......................... 330/291 |

* cited by examiner

*Primary Examiner*—Lana Le
(74) *Attorney, Agent, or Firm*—Blakely Sokoloff Taylor & Zafman LLP

(57) ABSTRACT

Apparatus and methods for eliminating DC offset in a wireless communication device operable on a continuous basis or on a sampled basis. In a receive channel, the output of a forward variable gain amplifier is fed back to an RC circuit to charge the capacitor (C) to a voltage dependent on the DC offset in the variable gain amplifier output. The voltage on the capacitor is amplified and summed with the input to the variable gain amplifier. The RC circuit is configured to provide a high gain feedback at DC and very low frequencies, but very low gain at signal frequencies. Preferably the output of the forward variable gain amplifier is fed back to the RC circuit with a gain that is inversely proportional to the forward gain. Disconnection of the capacitor and feedback of the capacitor voltage provides sampled operation. Various embellishments and sample applications are disclosed.

32 Claims, 5 Drawing Sheets

APPARATUS AND METHODS FOR ELIMINATING DC OFFSET IN A WIRELESS COMMUNICATION DEVICE

BACKGROUND OF THE INVENTION

1. Field of the Invention

The present invention relates to direct current (DC) offset cancellation, and more particularly to DC offset cancellation in a wireless communication device.

2. Prior Art

Receivers are necessary components of communication links, and are used, for example, in two-way cellular phone communications or wireless local area networks. A simplified block diagram of a typical prior-art wireless receiver 100 is shown in FIG. 1. A signal from an antenna is fed to low-noise amplifier (LNA) 110. LNA 110 is a variable gain amplifier controlled by an automatic gain control (AGC) circuit for amplifying weak signals as necessary without introducing much noise. LNA 110 feeds mixer 120, which mixes down the received high-frequency signal to baseband frequencies (including 0 Hz), by effectively multiplying the received and amplified signal with a local-oscillator (LO) signal produced by an oscillator (not shown) in the receiver. The undesirable signals at very high frequencies produced by the mixing (multiplying) process are filtered out by baseband filter 130. The filtered signal is then amplified by baseband amplifier 140. The gain of baseband amplifier 140 is also made variable through AGC action; the gain being large when the received signal is weak, and small when the received signal is strong. The objective of this operation is to keep the output signal to a well defined power, so that it can be encoded by an analog-to-digital converter, or otherwise used, without undue distortion and noise.

A significant problem encountered in the design of direct-conversion receivers is the generation of a parasitic direct-current (DC) quantity, called DC offset, at the output of mixer 120. One of the main causes of this phenomenon is the parasitic leakage of some of the local oscillator signal to the antenna; this signal is then amplified by LNA 110 and mixes with itself. The result is a twice frequency component which gets filtered out by the baseband filter and a DC component corresponding to the DC offset mentioned above. This zero-frequency component may cause the output of the receiver to reach saturation. The problem is especially severe for standards in which the baseband extends all the way to nearly zero frequencies. A DC offset also occurs when the signals are not in-phase. The DC offset produced will depend on the phase difference between the signals. Such phase difference is unpredictable, as it can vary depending on fabrication tolerances and other factors. Another cause of an unpredictable DC offset is the leakage of a received signal to the local oscillator port. The DC offset due to all of the above factors can pass through baseband filter 130 and then be amplified by baseband amplifier 140, resulting in a large undesirable DC component at the output of system 100. The value of this component can be so large that certain circuits may reach saturation. This includes the output of baseband amplifier 140, resulting in nonlinear operation and thus signal distortion. In addition, this DC component shifts the desired signal at the output, and can lead to saturation or otherwise inadequate operation of a following stage analog-to-digital converter of the wireless receiver.

A wireless receiver operating, for example, in accordance with the IEEE 802.11a standard, uses orthogonal frequency division multiplexing (OFDM). Each frame transmitted has a preamble sequence 200, shown in FIG. 2. The preamble field is composed of ten repetitions of a "short training sequence" 210, used for AGC convergence, diversity selection, timing acquisition and DC offset cancellation in the receiver. The preamble field is further composed of two repetitions of a "long training sequence" 220, used for channel estimation and fine frequency acquisition, preceded by a guard interval 230. A short OFDM training symbol consists of 12 sub-carriers (±4, ±8, ±12, ±16, ±20 and ±24 with 312.5 KHz of spacing for 802.11a, and ±2, ±6, ±10, ±14, ±18 and ±22 with 312.5 KHz of spacing for Hiperlan2). The DC offset cancellation is to be achieved in the time frame of preamble sequence 200.

In view of the limitations of prior art solutions, it would be advantageous to provide an effective means for reducing the DC offset at the output of mixer 120, resulting in only a small DC component at the output of system 100. It would be further advantageous if such DC offset cancellation process did not interfere with the AGC operation. It would be further advantageous if such DC offset cancellation is achieved within the preamble 200 time frame, preceding the actual receipt of data.

DETAILED DESCRIPTION OF THE PREFERRED EMBODIMENTS

Figure 1:
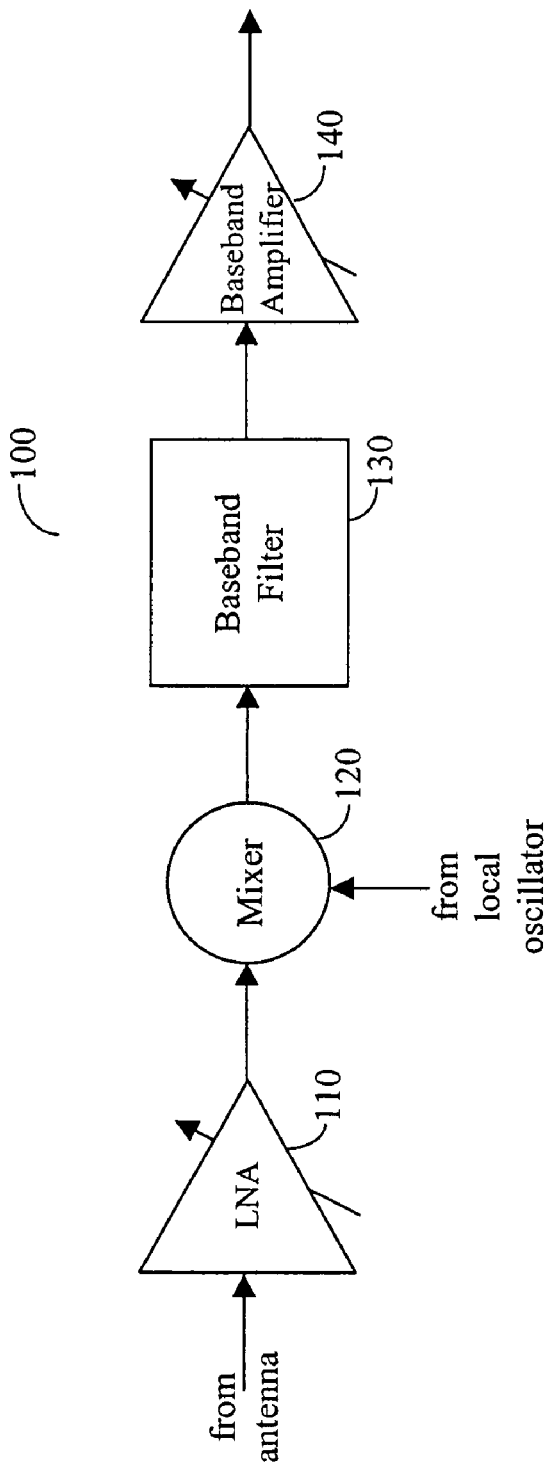
FIG. 1 is a block diagram of an exemplary prior art wireless receiver.
Figure 2:
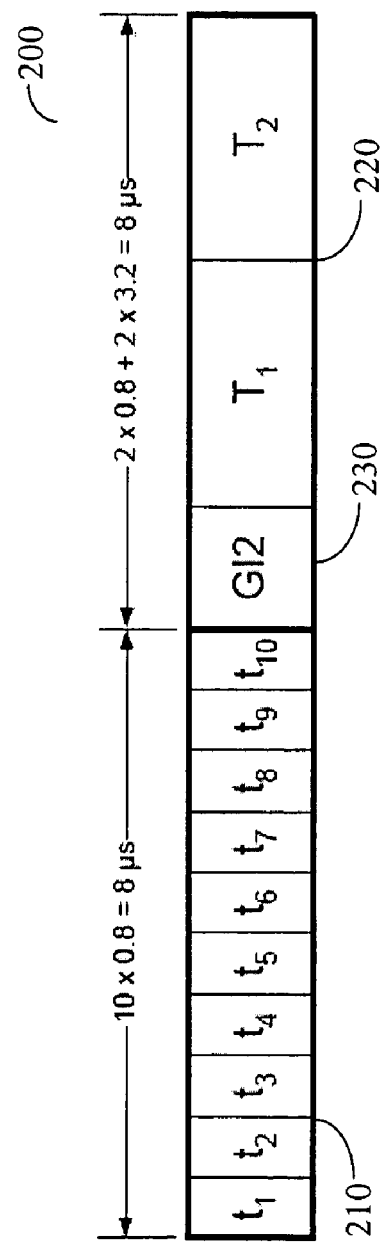
FIG. 2 illustrates the preamble of OFDM signaling in accordance with the IEEE 802.11a standard.

The present invention comprises a direct current (DC) servo loop that samples at least a portion of the output signal of system 100 shown in FIG. 1, and after amplification, returns it in a negative phase to the input of baseband filter 130. However, it is essential to use different gains for the case of the near DC frequency, i.e., around zero Hertz, while providing a significant gain around the signal frequency band. By adjusting the gain of the feedback loop for the two different frequency ranges, the DC offset is reduced while the signal frequency remains at a desired level.

In the description to follow, the invention will be described generally, and for purposes of illustration and not limitation, more specifically with respect to orthogonal frequency division multiplexing (OFDM), and at times most specifically in accordance with the IEEE 802.11a standard. However, this should not be viewed as limiting the use of the disclosed invention in such cases as Hiperlan2, as well as others.

Figure 3:
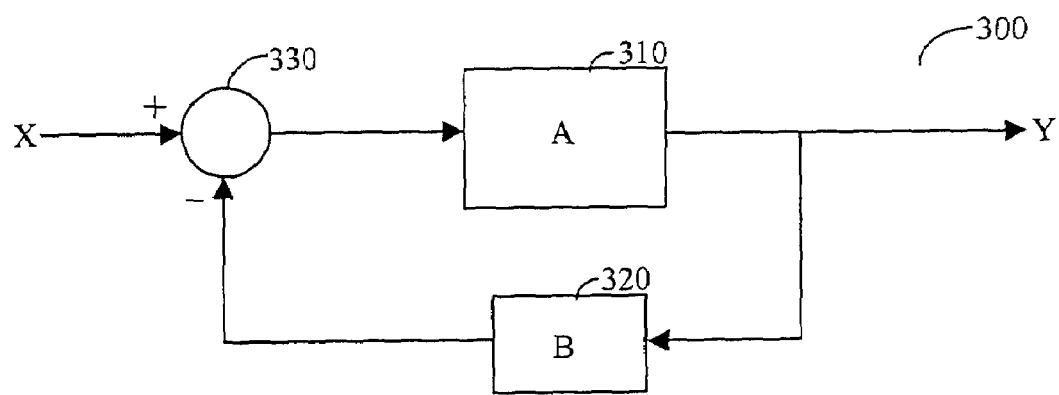
FIG. 3 is a schematic diagram of a basic feedback loop.

The principle of the DC offset cancellation of the present invention can be further understood with reference to FIG. 3, which shows a classical feedback control system 300. A portion of the output of amplifier 310 having a gain A is subtracted from the input X using summing unit 330. This subtraction, if effectively accomplished at zero frequency, i.e., at a DC condition, can drastically reduce or eliminate a DC offset that may be present at the input. With A representing the gain of forward amplifier 310 and B the gain of the feedback amplifier 320, the gain H from input X to output Y around DC frequencies is:

$$H = \frac{Y}{X} = \frac{A}{1+AB}$$

In a case where AB is much larger than 1, the above equation reduces to:

$$H_{DC} \approx \frac{1}{B}$$

The gain H will therefore be very small if B is sufficiently large. Thus, if X is a DC offset, it will only cause a small corresponding DC offset at the output. In the case of a receiver, the input X contains both a DC offset and the desired signal. Thus, the above operation can result in a drastic reduction not only of the DC offset, but of the desired signal as well. Hence, it would be necessary to design the system such that for frequencies around the signal frequency, the term AB will be of an absolute value substantially less than 1, such as, by way of example, 0.1 or less, causing the gain from input X to output Y around signal frequencies to be:

$$H_{SIGNAL} \approx A$$

Figure 4:
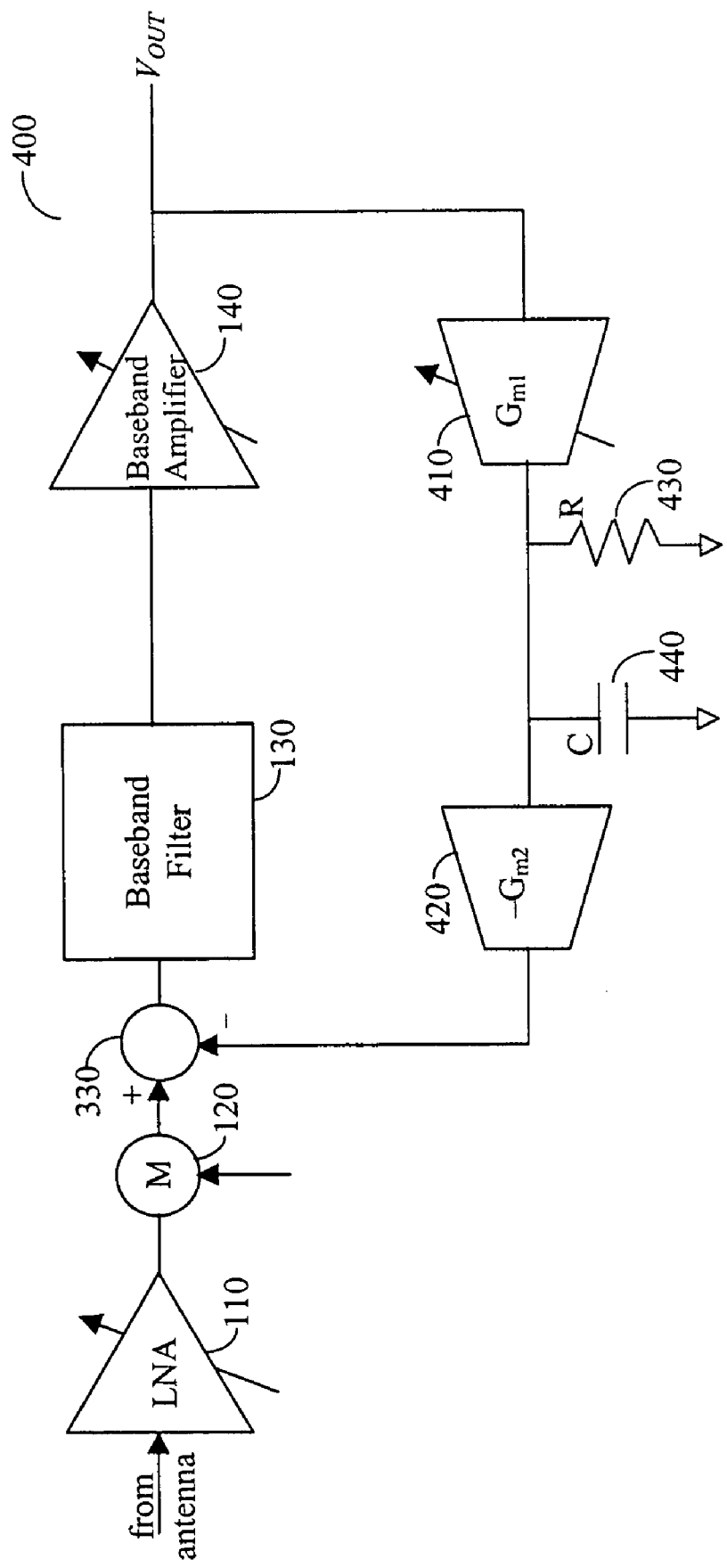
FIG. 4 is a detailed schematic diagram of a fast DC offset canceling circuit in accordance with the present invention.

Now referring to FIG. 4, an exemplary schematic block diagram of a DC servo loop 400 designed for DC offset cancellation in accordance with the present invention may be seen. This circuit may receive as the input $I_{in}$, the output of a mixer 120, such as shown on FIG. 1. In this example, baseband amplifier 140 has a gain of $A_{BB}$ while baseband filter 130 has a transresistance gain of $R_{mFILTER}$. Therefore, the forward path gain, equal to A in the previous discussion is:

$$A = R_{mFILTER} \times A_{BB}$$

A feedback loop comprising transconductor amplifiers 410 and 420 having a gain of $G_{m1}$ and $-G_{m2}$, respectively, is connected between the output of baseband amplifier 140 and the summing unit 330 coupled to the input of baseband filter 330. Transconductor amplifier 410 further feeds a parallel combination of a resistor (R) 430 and a capacitor (C) 440 coupled to a reference voltage, typically a circuit ground. Transconductor amplifier 420 amplifies the signal developed across of the R-C combination by its gain $-G_{m2}$, and produces a current that, because of its reverse nature, is in fact equivalent to subtraction from the input current $I_{IN}$. The summing unit 330 is shown in FIGS. 4 (and 5) for completeness in generality, though the summing unit may be relatively trivial, as current summing from current sources may be done by direct connection of the lines.

The DC servo loop 400 can be described as operating in the following way. At low frequencies, capacitor 440 behaves as an open circuit and therefore can be ignored. The signal that is output from transconductor amplifier 410 is passed through resistor 430 and develops a proportionate voltage, which is also provided to the input of transconductor amplifier 420. The DC feedback path gain, corresponding to the B value discussed above, is:

$$B_{DC} = G_{m1} \times R \times G_{m2}$$

The minus sign of transconductor amplifier 420 is assumed to correspond to the minus input of summing unit 330 of FIG. 3. Therefore the DC gain of system 400 is approximately:

$$H_{DC} \approx \frac{1}{G_{m1} \times R \times G_{m2}}$$

At high frequencies, capacitor 440 behaves practically as a short circuit, effectively shorting the signal at the output of transconductor amplifier 410 to ground. As a result, transconductor amplifier 420 has almost no signal at its input and produces almost no signal at its output. This causes the gain B of the feedback loop to be insignificantly small, in fact about zero. Therefore the gain of DC servo loop 400 around the signal frequencies will be approximately:

$$H_{SIGNAL} \approx R_{FILTER} \times A_{BB}$$

A person skilled-in-the-art would now easily note that with the proper choice of element values $G_{m1}$, R, C, $G_{m2}$, $R_{mFILTER}$ and $A_{BB}$, $H_{DC}$ can be made very small while $H_{SIGNAL}$ can be made large. The operation described in detail above is continuous, i.e., the system continuously cancels its own DC offset.

Figure 5:
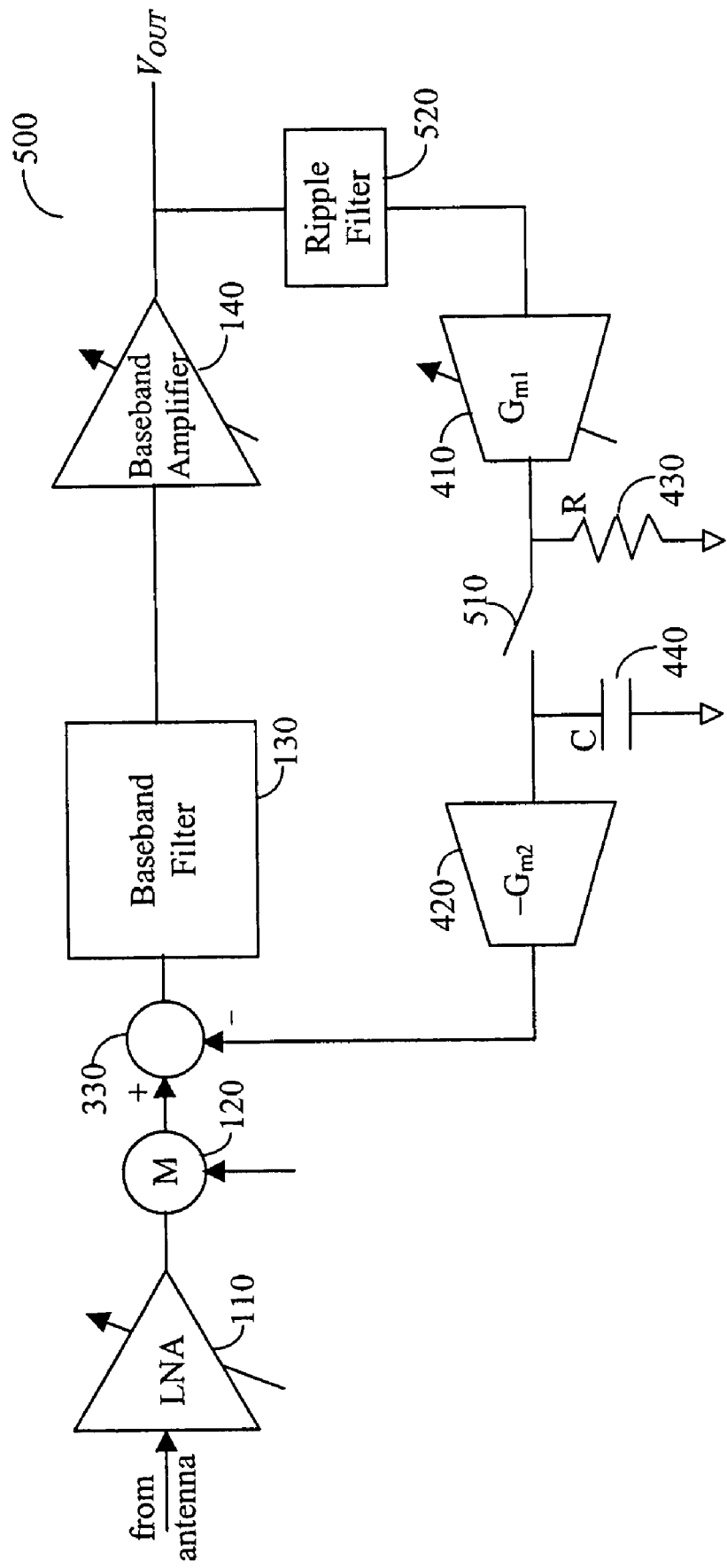
FIG. 5 is a detailed schematic diagram of a modified fast DC offset canceling circuit in accordance with the present invention.

Now referring to FIG. 5, an embodiment wherein a sampled mode of operation is obtained by adding a switch 510 between resistor 430 and capacitor 440 of DC servo loop circuit 500 may be seen. During the preamble of an OFDM signal, such as an OFDM signal in accordance with IEEE 802.11a, switch 510 is in the closed position and hence system 500 operates as explained in detail above, and the DC offset is therefore cancelled. The voltage developed across capacitor 440 and resistor 430 seeks a value that when multiplied by $G_{m2}$, is the value necessary for the cancellation of the DC offset at Vout.

At the end of the preamble time period, switch 510 is opened. The voltage that developed prior to the opening of switch 510 across capacitor 440 and resistor 430 will now be stored on capacitor 440. Capacitor 440 will retain its charge, as there is no discharge path; the path through switch 510 has been interrupted, and the input of transconductor amplifier 420 is the gate of a Metal-Oxide-Semiconductor (MOS) transistor, which is insulated from the rest of the device and thus cannot conduct DC current. The voltage on capacitor 440 will thus continue to provide the sampled voltage and cause the generation of an appropriate current at the output of transconductor amplifier 420 for DC offset cancellation. Assuming the DC offset inputted to DC servo loop 500 is substantially constant or slowly varying, the feedback current provided will be sufficient for canceling the DC offset during the subsequent time during which the signal is present. During the next preamble, switch 510 can be closed again, and the value of the capacitor voltage can be refreshed and updated in order to cancel the DC offset then present at the input of circuit 500. Thus the cycle repeats, updating the DC offset correction or cancellation on receipt of the preamble for each frame of data. Alternatively, the switch may be opened prior to the end of the preamble period, provided the time period the switch 510 is closed is such that the voltage across capacitor 440 can reach the level providing adequate cancellation of the DC offset.

Figure 6:
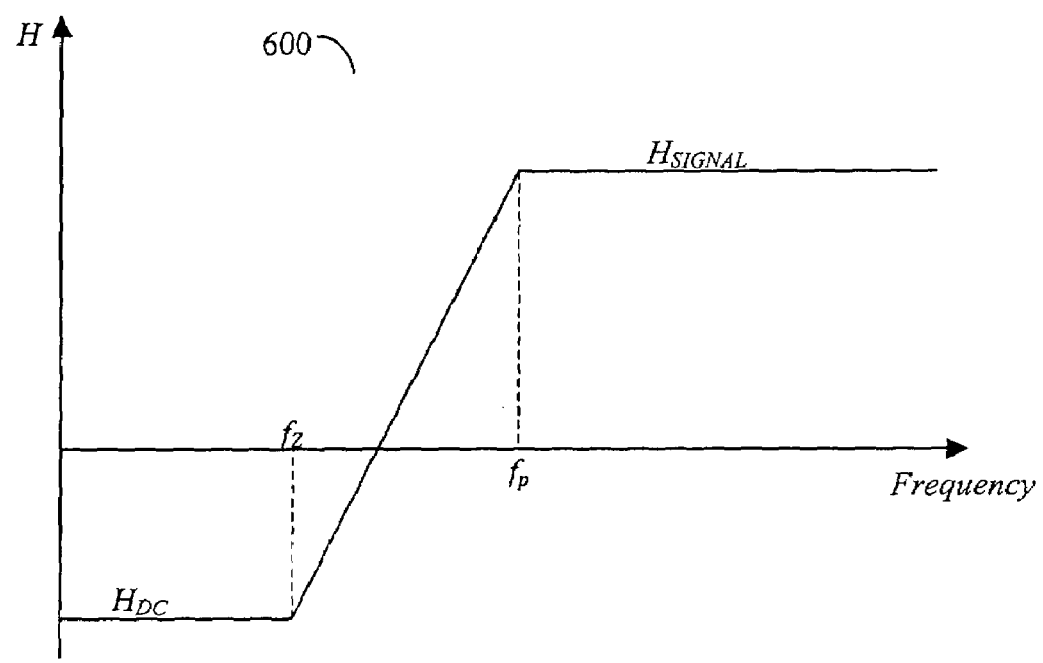
FIG. 6 is an exemplary graph of the frequency dependent transfer function of the DC offset canceling circuit of the present invention.

Now referring to FIG. 6, an exemplary graph of the frequency dependent transfer function of the DC offset canceling circuit in accordance with the disclosed invention is shown. The transresistance gain of the system, for example system 400, is significantly low at and around zero frequencies (DC) and significantly high at signal frequencies. For in-between frequencies the gain varies from the first value to the second value, as shown in FIG. 6. The "corner" frequencies $f_z$ and $f_p$ are known as a "zero" frequency, and a "pole" frequency, respectively. The frequency of $f_z$ for the exemplary embodiment can be shown to be:

$$f_z = \frac{1}{2\pi RC}$$

and $f_p$ can be shown to be:

$$f_p = f_z \times \frac{H_{SIGNAL}}{H_{DC}} = f_z \times R_{mFILTER} \times A_{BB} \times G_{m1} \times R \times G_{m2}$$

Therefore, $f_z$ is, in the first instance, constant and can be set to a desired value for optimum system operation. However, $f_p$ is proportional to baseband amplifier 140 gain that is not constant, but rather varies through the AGC action, depending on the amplitude of the signal received. This means that as the signal strength varies, so will $f_p$. Such behavior can lead to sub-optimal operation of system 400. Another problem that can arise is that if $f_p$ increases too much, the associated signal path phase shift, in combination with the phase shifts in other paths of the system (e.g., baseband filter 130), can reach 180 degrees at some frequency, which is equivalent to multiplication of the signal by a minus sign; the overall feedback can then change from negative to positive, and this can lead to undesired oscillations. To eliminate this potential, transconductor amplifier 410 gain may be designed respond to the same AGC signal as baseband amplifier 140, and to vary in inverse proportion to the varying gain $A_{BB}$ of baseband amplifier 140, thus maintaining the value of $f_p$ constant.

In another application of the disclosed invention, the filtering action of resistor 430 and capacitor 440 may not be enough to desirably suppress the high-frequency signal. As a result, the remaining ripple in the voltage across the resistor-capacitor combination may cause an error in the proper value to be sampled and hold for DC offset cancellation. However a person skilled-in-the-art could easily adapt the disclosed circuits and methods by adding filtering to the feedback path as may be necessary, such as the ripple filter 520 shown in FIG. 5.

In yet another embodiment of the disclosed invention, it may be necessary to speed-up the charging of capacitor 440. This may be necessary as it is critical that the DC servo loop completes its DC offset canceling cycle within the short duration of the preamble for a given wireless standard. This may be difficult to achieve in view of the fact that the capacitor 440 may have to be large for good filtering and holding properties. It is well-known in the art that the rate at which a current I charges a capacitor is I/C, which implies that a large charging current I may be necessary. If the current is not sufficiently large, effective DC offset cancellation cannot be achieved, and the resulting DC offset can cause saturation in the output of system 400.

Figure 7:
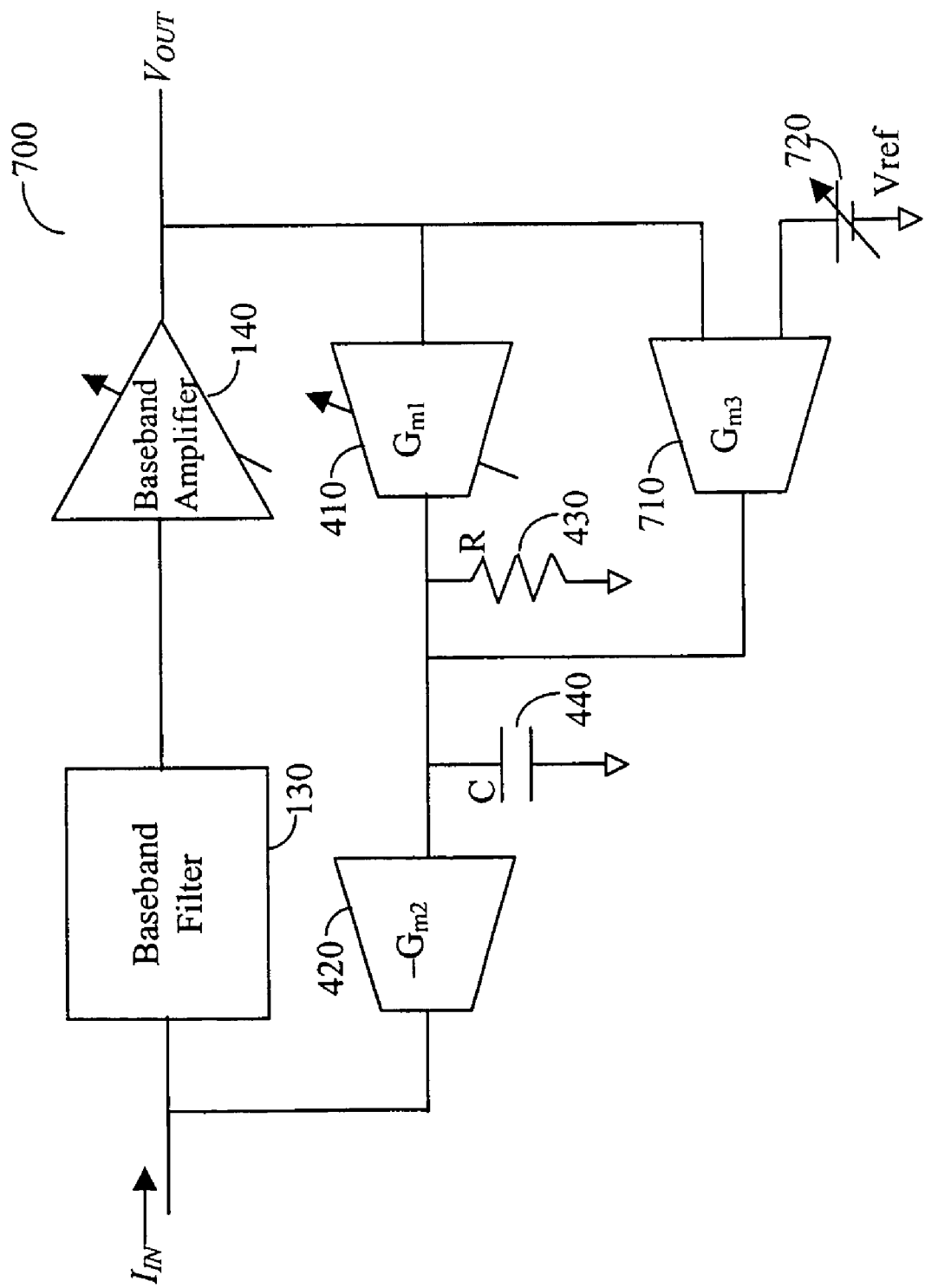
FIG. 7 is an exemplary DC offset canceling circuit with a capacitor charging acceleration circuit.

Reference is now made to FIG. 7, where an exemplary DC offset canceling circuit 700 having a capacitor charging acceleration function is shown. In this Figure, the output of baseband amplifier 140 is sensed by transconductor amplifier 710, and compared to a pre-determined threshold value of reference source 720. If this threshold value is exceeded, transconductor amplifier 710 is activated, which produces extra charging current in order to accelerate the charging of capacitor 440. This will achieve complete charging to the proper value within the allotted time frame.

In the embodiment of FIG. 7, the output Vout will include the AC training signals. However even though the input signal to the transconductor amplifier is not a DC signal, the threshold voltages can be chosen in such a way that the speed-up circuit is activated when the output DC offset drives the baseband amplifier to near saturation. By way of example, assume an output signal with a maximum voltage swing of 1V, set through the AGC function. If the threshold voltages of the speed-up circuit are set to 2V, the speed-up circuit will be activated only when the output DC offset exceeds 2V−1V=1V.

A person skilled-in-the-art would note that in order to achieve fast DC offset cancellation, the value of $f_z$ and $f_p$ must be large. This, however, can cause inadequate signal handling. In order to allow fast DC offset cancellation and subsequent adequate signal handling, the frequencies of $f_z$ and $f_p$ can be allowed to vary. Therefore, in another embodiment of the disclosed invention, $f_z$ and $f_p$ can be made relatively large at the beginning of the preamble, allowing the loop to quickly attain the required DC offset cancellation. Subsequently these frequencies can be changed to lower values, in preparation for signal handling. By way of example, the equation for $f_z$ is:

$$f_z = \frac{1}{2\pi RC}$$

Since it is the voltage on the capacitor achieved during the preamble that provides the offset cancellation, the value of the capacitor 440 would not be changed, but rather the value of the resistor 430 may be changed (reduced) at the beginning of the preamble to temporarily raise $f_z$ as desired.

$f_p$ was shown to be:

$$f_p = f_z \times \frac{H_{SIGNAL}}{H_{DC}}$$
$$= f_z \times R_{mFILTER} \times A_{BB} \times G_{m1} \times R \times G_{m2}$$
$$= \frac{1}{2\pi C} \times R_{mFILTER} \times A_{BB} \times G_{m1} \times G_{m2}$$

Thus $f_p$ is independent of the value of resistor 430, though may be temporarily increased at the beginning of the preamble be switching the gain of one or more of the amplifiers, preferably one or both of the transconductor amplifiers, to a higher gain.

As pointed out before with respect to FIG. 3, with A representing the gain of the forward amplifier and B the gain of the feedback amplifier, the gain H from input X to output Y around DC frequencies, where AB, the product of the forward gain and the feedback gain, is substantially less in absolute value than 1, such as, by way of example, 0.1 or less, is:

$H_{SIGNAL} \approx A$

This is the case in the various embodiments of the present invention for frequencies greater than $f_p$, as the capacitor will tend to act as an AC ground, holding the feedback gain to substantially zero.

In the case where AB, the product of the forward gain and the feedback gain, is much larger than 1, the above equation reduces to:

$$H_{DC} \approx \frac{1}{B}$$

This is the case in the various embodiments of the present invention for frequencies less than $f_z$, as now the capacitor will have negligible effect on the feedback gain.

As a specific example of the foregoing, in one embodiment directed to the IEEE 802.11a specification, the ratio $f_p/f_z$ is kept constant at 15,000. During the first 4 μ sec of the preamble, $f_p$ is set at 240 kHz, while for the last 4 μ sec of the preamble, it is reduced to 60 kHz. Thus under these conditions, $f_z$ will be 16 Hz during the first 4 μ sec of the preamble, while for the last 4 μsec of the preamble, it is reduced to 4 Hz. While different values could be used, depending on the application, $f_z$ will preferably be less than 50 Hz, and more preferably less than 25 Hz.

In the foregoing embodiment, the closed loop gain at the operating frequencies varies from 55 dB to −18 dB, while the closed loop gain around zero is always 83 dB lower than the closed loop gain at the operating frequencies. The DC offset cancellation circuit may be kept active all the time as in FIG. 4, or used in a sample (during the preamble period) and hold (after each preamble period) manner, though the sample and hold operation is preferred as requiring less power, an important consideration in hand held battery operated devices, and as providing satisfactory DC offset cancellation in most applications, provided the DC offset may drift with time, but is not subject to large or rapid changes between preamble periods.

The above description covers only the main features of the invention. It is to be understood by those skilled in the art that further variations and enhancements may be incorporated, depending on the application, without departing from the spirit of the disclosed invention, including, but not limited to, the realization of the circuit in integrated circuit (IC) form. Thus while certain preferred embodiments of the present invention have been disclosed and described herein, it will be understood by those skilled in the art that various changes in form and detail may be made therein without departing from the spirit and scope of the invention. Similarly, the various aspects of the present invention may be advantageously practiced by incorporating all features or various sub-combinations of features as desired.

What is claimed is:

1. An amplifier system for amplifying signals having frequencies above a second frequency, the amplifier system having a frequency dependent direct current (DC) offset canceling system, comprising:
    a forward amplifier having a forward amplifier gain and providing a system output;
    a feedback amplifier having an input coupled to the system output and having a feedback amplifier gain, wherein the product of said forward amplifier gain and said feedback amplifier gain is larger than one below a first frequency and substantially less than one above the second frequency, the second frequency being higher than the first frequency; and,
    a summing unit coupled to combine an input signal and a feedback signal from said feedback amplifier, and providing the combined signal as an input to said forward amplifier.

2. The system of claim 1 wherein the magnitude of the product of said forward amplifier gain and said feedback amplifier gain above the second frequency is 0.1 or less.

3. The system of claim 1 wherein said system is at least partially realized in integrated circuit form.

4. The system of claim 1 wherein said feedback amplifier comprises:
    a first transconductor amplifier having a first transconducting gain, the output of said first transconductor amplifier being connected to a first node of a resistor and a first node of a capacitor, a second node of said resistor and a second node of said capacitor being connected together and to a reference voltage; and,
    a second transconductor amplifier having a second inverting transconducting gain, the input of said second transconductor amplifier being connected to said output of said first transconductor amplifier.

5. The system of claim 4, wherein said capacitor and said resistor cause said first frequency to be less than 50 Hz.

6. The system of claim 4 wherein said forward amplifier further comprises:
    a baseband filter having a transresistance gain; and,
    a baseband amplifier having a baseband gain;
    wherein said forward amplifier gain is equal to the product of said transresistance gain and said baseband gain.

7. The system of claim 6 wherein said baseband gain is variable, and the product of said baseband gain and said first transconducting gain is constant.

8. The system of claim 4 wherein said first node of said resistor is connected to said first node of said capacitor through a switch, said first node of said resistor being connected to said output of said first transconductor amplifier and said first node of said capacitor being connected to said input of said second transconductor amplifier.

9. The system of claim 8 wherein said switch is closed during at least an initial portion of a preamble period of an orthogonal frequency division multiplexing (OFDM) input signal.

10. The system of claim 9 wherein when said switch is closed, said capacitor is charged to a voltage canceling the DC offset at the output of said system.

11. The system of claim 10 wherein upon opening of said switch, the voltage stored on said capacitor causes the continued cancellation of the DC offset at the output of said system.

12. The system of claim 4, wherein a filtering circuit is added to said feedback amplifier path for the purpose of filtering out high frequency ripple.

13. The system of claim 4, wherein sensing means is connected to said output of said system and further compared against a threshold value.

14. The system of claim 13, wherein upon exceeding of said threshold value a speed-up circuit is activated to charge said capacitor.

15. The system of claim 1, wherein during at least an initial portion of the preamble period of an OFDM signal, said first frequency is higher than said first frequency following said preamble period.

16. The system of claim 1, wherein during at least an initial portion of the preamble period of an OFDM signal said second frequency is higher than said second frequency following said preamble period.

17. A wireless receiver comprising:
    a low-noise amplifier having an input coupled to an antenna output;
    a mixer coupled to receive a signal from said low-noise amplifier, said mixer being capable of mixing said signal from said low-noise amplifier with a local oscillator frequency and providing a mixer output signal;

a forward amplifier coupled to receive said mixer output signal and providing a receiver output signal, the forward amplifier having a forward amplifier gain;

a feedback amplifier coupled to receive an output from said forward amplifier and having a feedback amplifier gain, the magnitude of the product of said forward amplifier gain and said feedback amplifier gain being larger than one below a first frequency and substantially less than one above a second frequency higher than the first frequency; and, a summing unit for combining said mixer output signal and a feedback signal from said feedback amplifier, and providing the combined signal as an input to said forward amplifier.

18. The system of claim 17 wherein the magnitude of the product of said forward amplifier gain and said feedback amplifier gain above the second frequency is 0.1 or less.

19. The wireless receiver of claim 17, wherein said wireless receiver is at least partially realized in integrated circuit form.

20. The wireless receiver of claim 17, wherein said feedback amplifier further comprises:

a first transconductor amplifier having a first transconducting gain, the output of said first transconductor amplifier being connected to a first node of a resistor and a first node of a capacitor, a second node of said resistor and a second node of said capacitor being connected together and to a reference voltage; and, a second transconductor amplifier having a second inverting transconducting gain, the input of said second transconductor amplifier being connected to said output of said first transconductor amplifier.

21. The wireless receiver of claim 20, wherein said capacitor and said resistor cause said first frequency to be less than 50 Hz.

22. The wireless receiver of claim 20, wherein said forward amplifier further comprises:

a baseband filter having a transresistance gain; and, a baseband amplifier having a baseband gain;

wherein said forward amplifier gain is equal to the product of said transresistance gain and said baseband gain.

23. The wireless receiver of claim 22 wherein said baseband gain is variable, and the product of said baseband gain and said first transconducting gain is constant.

24. The wireless receiver of claim 20, wherein said first node of said resistor is connected to said first node of said capacitor through a switch, said first node of said resistor being connected to said output of said first transconductor amplifier and said first node of said capacitor being connected to said input of said second transconductor amplifier.

25. The wireless receiver of claim 24 wherein said switch is closed during at least an initial portion of the preamble period of an orthogonal frequency division multiplexing (OFDM) input signal.

26. The wireless receiver of claim 25 wherein when said switch is closed, said capacitor is charged to a voltage canceling the DC offset at said output of said wireless receiver.

27. The wireless receiver of claim 26 wherein upon opening of said switch, the voltage stored on said capacitor causes the continued cancellation of the DC offset at the output of said system.

28. The wireless receiver of claim 20, wherein a filtering circuit is added to said feedback amplifier path for the purpose of filtering a high frequency ripple.

29. The wireless receiver of claim 20, wherein sensing means is connected to said output of said system and further compared against a threshold value.

30. The wireless receiver of claim 29, wherein upon exceeding of said threshold value a speed-up circuit is activated to charge said capacitor.

31. The wireless receiver of claim 17 wherein during at least an initial portion of the preamble period of an OFDM signal said first frequency is higher than said first frequency after the preamble period.

32. The wireless receiver of claim 17 wherein during at least an initial portion of the preamble period of an OFDM signal said second frequency value is higher than said second frequency after the preamble period.

* * * * *